United States Patent
Kingman et al.

(10) Patent No.: US 11,237,315 B1
(45) Date of Patent: Feb. 1, 2022

(54) LIGHT-CONTROL PANEL WITH LAYERED OPTICAL COMPONENTS

(71) Applicants: David E. Kingman, San Jose, CA (US); Christopher D. Jones, Los Gatos, CA (US); James R. Wilson, Cupertino, CA (US); Martin Melcher, Mountain View, CA (US); Peter F. Masschelein, Campbell, CA (US)

(72) Inventors: David E. Kingman, San Jose, CA (US); Christopher D. Jones, Los Gatos, CA (US); James R. Wilson, Cupertino, CA (US); Martin Melcher, Mountain View, CA (US); Peter F. Masschelein, Campbell, CA (US)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 16/751,575

(22) Filed: Jan. 24, 2020

Related U.S. Application Data

(60) Provisional application No. 62/813,210, filed on Mar. 4, 2019.

(51) Int. Cl.
    *F21V 8/00* (2006.01)
(52) U.S. Cl.
    CPC ........... *G02B 6/0026* (2013.01); *G02B 6/005* (2013.01)
(58) Field of Classification Search
    CPC .............................. G02B 6/0026; G02B 6/005

USPC .......................................................... 349/65
See application file for complete search history.

(56) References Cited

U.S. PATENT DOCUMENTS

| | | |
|---|---|---|
| 8,098,419 B2 | 1/2012 | Higashida et al. |
| 8,199,264 B2 | 6/2012 | Veerasamy |
| 8,466,298 B2 | 6/2013 | Yuan et al. |
| 9,927,673 B2 | 3/2018 | Chang et al. |
| 9,989,798 B2 | 6/2018 | Kim et al. |
| 10,048,560 B1 | 8/2018 | Mazuir et al. |
| 2018/0170013 A1 | 6/2018 | Hubert et al. |
| 2020/0201093 A1* | 6/2020 | Yang .................... G02F 1/1333 |

FOREIGN PATENT DOCUMENTS

CN        207301866 U        5/2018

* cited by examiner

*Primary Examiner* — Nathanael R Briggs
*Assistant Examiner* — William D Peterson
(74) *Attorney, Agent, or Firm* — Young Basile Hanlon & MacFarlane, P.C.

(57) ABSTRACT

Light-control panels including layered optical components are described in this application. An example of a light-control panel includes first and second glazing layers and first and second switchable components extending between the first and second glazing layers. The light-control panel also includes a thermal coating extending between the first switchable component and the first glazing layer and a filter extending between the first and second switchable components.

20 Claims, 6 Drawing Sheets

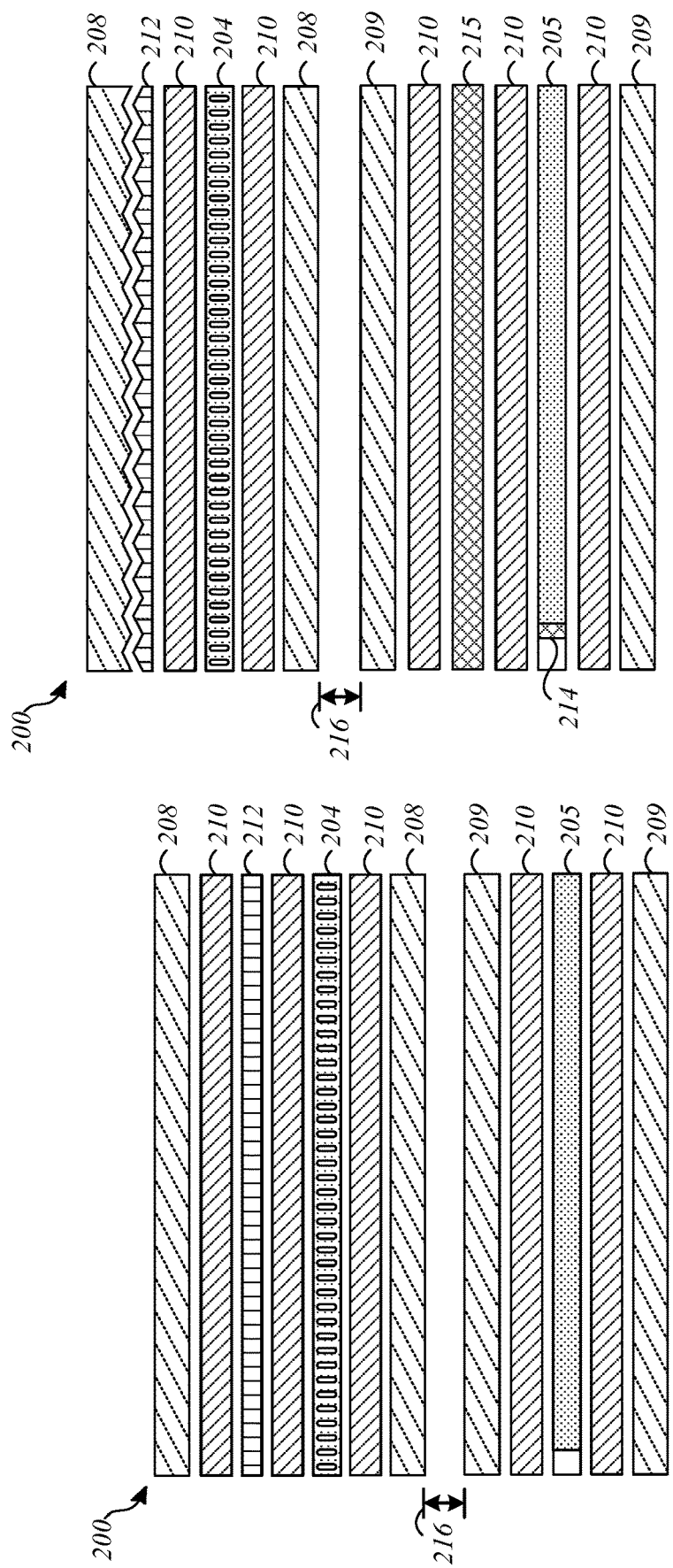

LIGHT-CONTROL PANEL WITH LAYERED OPTICAL COMPONENTS

CROSS-REFERENCE TO RELATED APPLICATION(S)

This application claims the benefit of U.S. Provisional Application No. 62/813,210, filed on Mar. 4, 2019. The content of the foregoing application is incorporated herein by reference in its entirety for all purposes.

TECHNICAL FIELD

This disclosure relates generally to light-control panels and in particular to light-transmissive panels formed from laminated glass or glazing that use a variety of layered, complementary optical components to produce, direct, and block light transmission.

BACKGROUND

Panels or glazings, such as those made of glass, polycarbonate, plastic, composite, or other light-transmissive material, have optical properties that determine functionality of the panel, such as panel transmittance. Optical components, such as guest-host liquid crystal (GHLC) films, light-guide plates, and thermal coatings, can be used in laminated glass, glazing, or panels formed from other light-transmissive materials to selectively modify various optical properties of the panel, such as to selectively provide thermal shielding from radiation such as sunlight, single or bi-directional illumination, or wavelength-specific filtering for privacy within a vehicle cabin or office, thus serving as various types of light-control panels.

SUMMARY

One aspect of the disclosed embodiments is a panel that includes first glazing layers; a first switchable component extending between the first glazing layers; second glazing layers disposed adjacent to and spaced from the first glazing layers by a distance defined by an air gap; and a second switchable component extending between the second glazing layers.

Another aspect of the disclosed embodiments is a panel that includes first glazing layers; a thermal coating extending between the first glazing layers; second glazing layers disposed adjacent to and spaced from the first glazing layers by a distance defined by an air gap; first and second switchable components extending between the second glazing layers; and a lamination layer extending between the first and second switchable components.

Another aspect of the disclosed embodiments is a panel that includes first and second glazing layers; first and second switchable components extending between the first and second glazing layers; a thermal coating extending between the first switchable component and the first glazing layer; and a filter extending between the first and second switchable components.

BRIEF DESCRIPTION OF THE DRAWINGS

FIGS. 2A and 2B are exploded cross-sectional views of the panel of FIG. 1 taken along line 2-2 of FIG. 1 including layered optical components.

DETAILED DESCRIPTION

Light-control panels for use in vehicle cabins or office buildings can be formed from laminated glass or other light-transmissive materials layered with various optical components such as thermal coatings, light guide plates, filters, air gaps, suspended particle devices, electrochromic devices, polymer dispersed liquid crystal (PDLC) devices, or guest host liquid crystal (GHLC) devices in order to provide features such as adjustable tint, in-glass lighting, privacy, diffuse reflection, thermal protection, and NVH performance. The optical components can be included in a stack-up designed to optimize overall performance of the light-control panel while providing combinations of the described features. The term optical component is used to identify various portions of the light-control panel providing specified optical properties. Each optical component may be of singular, uniform construction or may alternatively comprise multiple sub-parts, layers, or other features that together to achieve the specified optical properties described for the given optical component.

Figure 1:
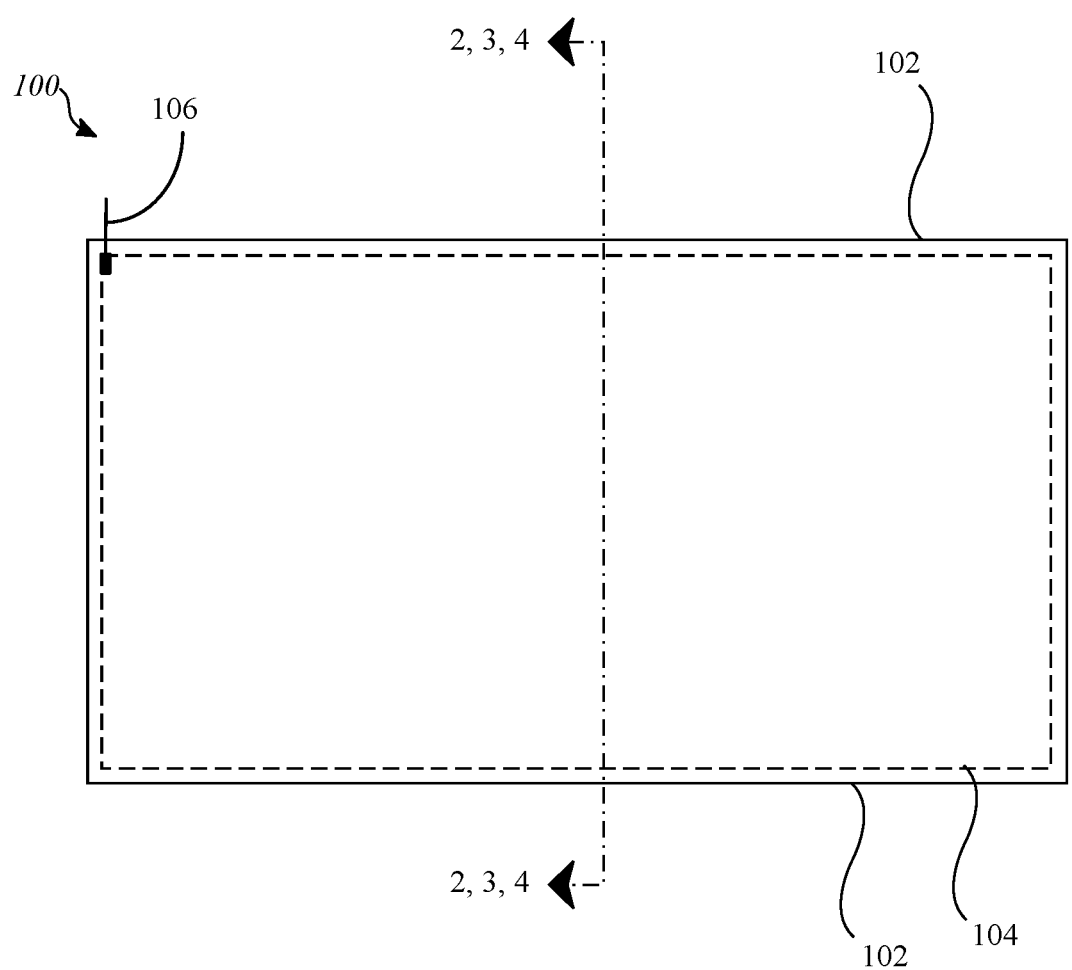
FIG. 1 is a plan view illustration showing a light-control panel.

FIG. 1 is a plan view illustration showing a laminated glazing or panel, designated generally as panel 100. The panel 100 may be used, for example, in a vehicle windshield, side window, sunroof, or backlight, or in another application, such as in building construction as an office window. The panel 100 can include various internal layers having optical properties, safety properties, and adhesive properties in various stack-ups further described below.

The panel 100 can have outer edges 102 and can include at least one switchable component 104 designated in dotted line to indicate its internal position within the panel 100. The term "switchable" is used to denote that a state change is possible for the component, such as between on and off states, between opaque and translucent states, or between bright and dim states, for example. Other state changes for the switchable component 104 are also possible. The at least one switchable component 104 can extend near or adjacent to the outer edges 102 of the panel 100 without reaching the outer edges 102 as shown. The switchable component 104 can also extend fully to the outer edges 102 of the panel 100. The panel 100 can include an edge treatment (not shown) suitable for allowing the panel to be held, for example, in a frame (not shown).

The panel 100 can include an electrical connection 106. The electrical connection 106 is connected to a power source and/or to a controller to provide electrical power and/or control signals to the at least one switchable component 104 that is incorporated in the panel 100. Electrical power and/or control signals passing through the electrical connection 106 to the at least one switchable component 104 can be used to modify a degree of light transmission through the panel 100. For example, an amount of light transmitted through the panel 100 may be controllable by a voltage of a control signal delivered to the switchable component 104 by the electrical connection 106, producing, for example, a tint or darkening of the panel 100 as perceived by an occupant inside a vehicle or a pedestrian outside the vehicle. The electrical connection 106 may incorporate transparent electrodes, such as indium tin oxide (ITO) electrodes, to allow control of the variable light-transmissive properties of the at least one switchable component 104 within the panel 100.

FIGS. 2A and 2B are exploded cross-sectional views of the panel 100 of FIG. 1 taken along line 2-2 of FIG. 1. For clarity, the cross-sections in FIGS. 2A and 2B will be described as panel 200. The panel 200 includes a pair of embedded switchable components, for example, a GHLC device 204 serving as a first switchable component and light guide device 205 serving as a second switchable component. The first and second switchable components extend between or are otherwise sandwiched among glazing layers 208, 209, lamination layers 210, thermal coatings 212, filters 214, 215, and an air gap 216 in combinations further described below to provide adjustable tint, in-glass lighting, privacy, diffuse reflection, thermal protection, and NVH performance features. The panel 200 is formed by stacking, sandwiching, layering, or otherwise combining optical components one on top of the other or one disposed within another, and when one layer or optical component is described as extending between others, its location within the stack-up is being described. The layers or optical components within the panel 200 may be co-extensive, or gaps or fillers may also be present to form the panel 200.

The GHLC device 204 can be used to provide adjustable tint. Examples of GHLC technologies include, for example, dichroic dyes having absorbing orientations and non-absorbing orientations and polymer-dispersed liquid crystals (PDLC) in the form of liquid crystal droplets dispersed in a polymer matrix that have optical axes that orient differently depending on whether an electric field is applied. In short, application of an electric field to liquid crystal can adjust an amount of light transmission through the GHLC device 204. Other films, devices, or other adjustable tint technologies are also possible. The GHLC device 204 in FIGS. 2A and 2B is located in the top, upper, or outermost half of the panel 200, between upper or first glazing layers 208. In this location, any heat generated by operation of the GHLC device 204 is generally isolated from the bottom, lower, or innermost half of the panel 200. In addition, positioning the GHLC device 204 as shown provides heat reduction, for example, when the GHLC device 204 is in a state that blocks light transmission through the panel 200. This keeps the bottom, lower, or innermost half of the panel 200 cool to the touch, for example, when used as a sunroof or window for a vehicle cabin.

The light guide device 205 in FIGS. 2A and 2B is located in the bottom, lower, or innermost half of the panel 200, between lower or second glazing layers 209. The light guide device 205 can be used to provide in-glass lighting. In-glass lighting technologies include, for example, a light guide plate, a light guide film, or other light guide device intended to evenly distribute and emit light. For example, in some light guide plates, light sources such as light-emitting diodes (LEDs) that are located at an edge or an end of the light guide plate are used in combination with polymethyl methacrylate (PMMA, e.g. acrylic) outer surfaces of the light guide plate along with filters or films to create a distributed, surface-based light source that can serve as the light guide device 205. Other light guide devices 205 or films are also possible.

The GHLC device 204 and the light guide device 205 can be used together to provide privacy. For example, the light guide device 205 can be pulsed according to a first on-off pattern at a speed higher than the human eye can perceive (e.g., no flicker is detected) such that an interior of a vehicle cabin is lit by the light guide device 205 using the panel 200. At the same time, the GHLC device 204 can be pulsed according to a second on-off pattern that is inversely related to the first on-off pattern, blocking the light from the light guide device 205 from being seen by a pedestrian outside of the vehicle cabin. There is no flashing or strobe effect, either inside or outside of the vehicle cabin, instead, the occupants within the vehicle cabin have a light source and the pedestrians or occupants in other vehicles outside of the vehicle cabin perceive that the panel 200 is dark or opaque. This is especially useful, for example, in the absence of solar radiation, that is, when an external environment around a vehicle cabin is generally dark. In this example, the occupants within the vehicle cabin are able to use light generated by the light guide device 205 within the vehicle cabin without allowing pedestrians in the dark environment outside of the vehicle cabin to see inside of the vehicle cabin.

The order in which the GHLC device 204 and the light guide device 205 are located within the stack-up of the panel 200 is important. First, the GHLC device 204 is used to block light generated by the light guide device 205 to provide privacy when viewed from one side of the panel 200 (in this example, from above the top or outermost layer of the first glazing layers 208, described as a position outside or above the panel). Second, the light guide device 205 is used to provide a source of light when viewed from the other side of the panel 200 (in this example, from below the bottom or innermost glazing layer of the second glazing layers 209, described as a position inside or below the panel). The GHLC device 204 would (selectively) block light should it be located between the light guide device 205 and the innermost glazing layer of the second glazing layers 209.

The glazing layers 208, 209 serve as the outermost and innermost layers of the panel 200 as a whole. The glazing layers 208, 209 also serve as the outermost and innermost layers of portions of halves of the panel 200 as shown in the example of FIGS. 2A and 2B. In other words, the first glazing layers 208 serve as the outermost and innermost layers of the top half of the panel 200 and the second glazing layers 209 serve as the outermost and innermost layers of the bottom half of the panel 200, the halves being physically separated by the air gap 216. The first and second glazing layers 208, 209 can be formed from glass or polycarbonate. Other glazing materials are also possible, with the glazing materials generally being solid in form as well as having light-transmissive material properties. The first and second glazing layers 208, 209 can also have strength and safety properties, such as anti-shatter or bulletproof-type construction.

The lamination layers 210 can be used to adhere the various optical components in the panel 200 together. The lamination layers 210 can be formed from polyvinyl butyral (PVB), thermoplastic polyurethane (TPU), ethylene vinyl acetate (EVA), or other optically-clear adhesives (OCA) having low color indices that allow for high transparency. Other lamination materials are also possible, with the lamination materials generally having light-transmissive, heat-softening, and adhesive-bonding material properties. The various optical components of the panel 200 can be laminated in the described stack-ups using heat, pressure, and adhesion of lamination layers 210 to the optical components according to a traditional lamination and curing process, for example, using vacuum bagging and autoclaving. Other lamination processes to adhere the optical components are also possible. Though lamination layers 210 are shown as present between most of the optical components in the panel 200, some of the optical components may alternatively extend directly along or adjacent to other optical components should at least one of the co-extensive optical components have adhesive or bonding material properties.

The thermal coatings 212 can be used to provide thermal protection using reflection and absorption. The thermal coatings 212 can be conductive coatings with laser etching or non-conductive coatings that allow antenna signals such as radio signals to pass through the panel 200 while reflecting or absorbing, for example, solar radiation. The use of thermal coatings 212 to reduce heat caused by solar radiation can both improve performance of the switchable components embedded in the panel 200 and improve comfort for occupants in a vehicle cabin having laminated surfaces formed of the panel 200. The thermal coatings 212 in the panel 200 are located directly below the top, upper, or outermost first glazing layer 208 to provide efficient heat reduction, providing thermal protection both to other optical components within the panel 200 and, for example, to occupants within a vehicle cabin using the panel 200.

The thermal coatings 212 can also be used to provide diffuse reflection. Diffuse reflection can be a used as a cosmetic feature to provide a matte look or a mirror look when the panel 200 is viewed, for example, from a position outside of a vehicle cabin, that is, outside of or above the panel 200 as shown. The cosmetic appearance of the panel 200 can be similar to that of anodized aluminum while at the same time providing haze-free or fully-clear optical performance. In FIG. 2A, diffuse reflection is achieved by surrounding a structured film and thermal coating 212 with lamination layers 210 under an outermost first glazing layer 208 of the panel. In FIG. 2B, diffuse reflection is achieved by applying a thermal coating 212 directly to a frosted or etched surface of the outermost first glazing layer 208, the frosted or etched surface indicated by the jagged surface representation of these optical components in FIG. 2B. In the example of FIG. 2B, a lamination layer 210 is also adhered to the thermal coating 212 in a manner that fills gaps and avoids refraction through the outermost first glazing layer 208.

Several filters 214, 215, either separately or in combination, can be used to provide privacy, for example, in place of or in addition to using synchronized, opposing, on-off pulsation of the GHLC device 204 and the light guide device 205 as described above. Though two filters 214, 215 are shown in FIG. 2B, privacy for occupants within a vehicle cabin can be achieved with use of each of the filters 214, 215 located in different panels or in different locations within the same panel (not shown, but described below).

For example, as shown in FIG. 2B, the filter 214 is disposed within the light guide device 205 and acts as a band-pass-type filter between a light source and a light guide plate within the light guide device 205. The band-pass-type filter can allow specific, narrow bands within visible wavelengths to pass from the light source to the light guide plate of the light guide device 205. For example, the filter 214 can be configured to allow predetermined, narrow bands within the broader red, green, and blue (RGB) spectrum to pass from the light source to the light guide plate. In this manner, the light guide device 205 can further distribute this filtered light in both directions through the panel 200 and natural light can also pass through the panel 200.

Also shown in FIG. 2B, the filter 215 that is located between the light guide device 205 and the air gap 216 can be designed as a notched-type filter to block wavelengths in the predetermined, narrow RGB wavelength bands that are allowed through the band-pass-type filter 214 while allowing other wavelength bands of visible light to pass through the filter 215. The filter 215 thus blocks the predetermined, narrow bands of RGB light emitted by the light guide device 205 from being perceived by pedestrians outside of the vehicle cabin, achieving a privacy feature for occupants within the vehicle cabin. At the same time, the narrow bands of RGB light generated by the light guide device 205 pass through the innermost second glazing layer 209 into the vehicle cabin such that the occupants within the vehicle cabin experience lighting from the predetermined RGB wavelength bands of light produced by the light guide device 205. Though the filters 214, 215 are described as band-pass-type and notched-type, respectively, other types of filters can be used as well to modify light transmission.

In another example (not shown), the light guide device 205 including the band-pass-type filter 214 can be present in a roof panel or backlight while the notched-type filter 215 is present and the light guide device 205 is absent in a vehicle side window, allowing the roof panel or backlight to supply predetermined, narrow RGB wavelengths of light into the vehicle cabin while the side windows block the same RGB wavelengths of light from being perceived by pedestrians outside of the vehicle cabin. In this example, only side window privacy is achieved for occupants in a vehicle cabin, as any pedestrian able to see the roof panel would be able to view light generated by the light guide device 205 as well as light generated within the vehicle cabin in absence of additional filtering. This privacy solution can also be implemented with, for example, light-generating user devices such as smart phones or tablets in use by occupants within a vehicle cabin should the light-generating device employ a filter that allows only predetermined, narrow RGB wavelengths of light to be emitted by the light-generating device. That is, the notched-type filter 215 can also be used to block predetermined, narrow RGB wavelengths from the light-generating user device from view by pedestrians outside of the vehicle cabin.

The air gap 216 is used in the panel 200 to improve noise-vibration-harshness (NVH) performance of the panel 200 and to lower repair and replacement costs. The location of the air gap 216 in FIGS. 2A and 2B allows for ease of repair or replacement of a portion of the panel 200 instead of an entirety of the panel 200 by defining a physical gap between two halves of the panel, with either half of the panel 200 being replaceable should damage occur only to that half. The air gap 216 can be formed between the two central first and second glazing layers 208, 209 in the panel 200 as shown by using spacers (not shown) adhered to perimeters of the two central first and second glazing layers 208, 209. In other words, the air gap 216 can extend between the central-most first and second glazing layers 208, 209 as shown in FIGS. 2A and 2B. The air gap 216 of FIGS. 2A and 2B reduces a solar load on a bottom or lower portion of the panel 200 and allows for efficient function of both the GHLC device 204 and the light guide device 205 by isolating these devices from each other.

Though the air gap 216 of FIGS. 2A and 2B is shown as extending between the innermost or central-most first and second glazing layers 208, 209, in some embodiments (not shown) the air gap 216 can extend between the innermost second glazing layer 209, for example, the upper or top layer of the bottom or innermost half of the panel 200, and the GHLC device 204, for example, when the GHLC device 204 forms the bottom or lowermost layer of the top or outermost half of the panel 200 (not shown). The use of this style of air gap 216 would reduce the number of first glazing layers 208 in the panel 200 from two to one, reducing cost of the overall panel 200.

Figures 3A, 3B:
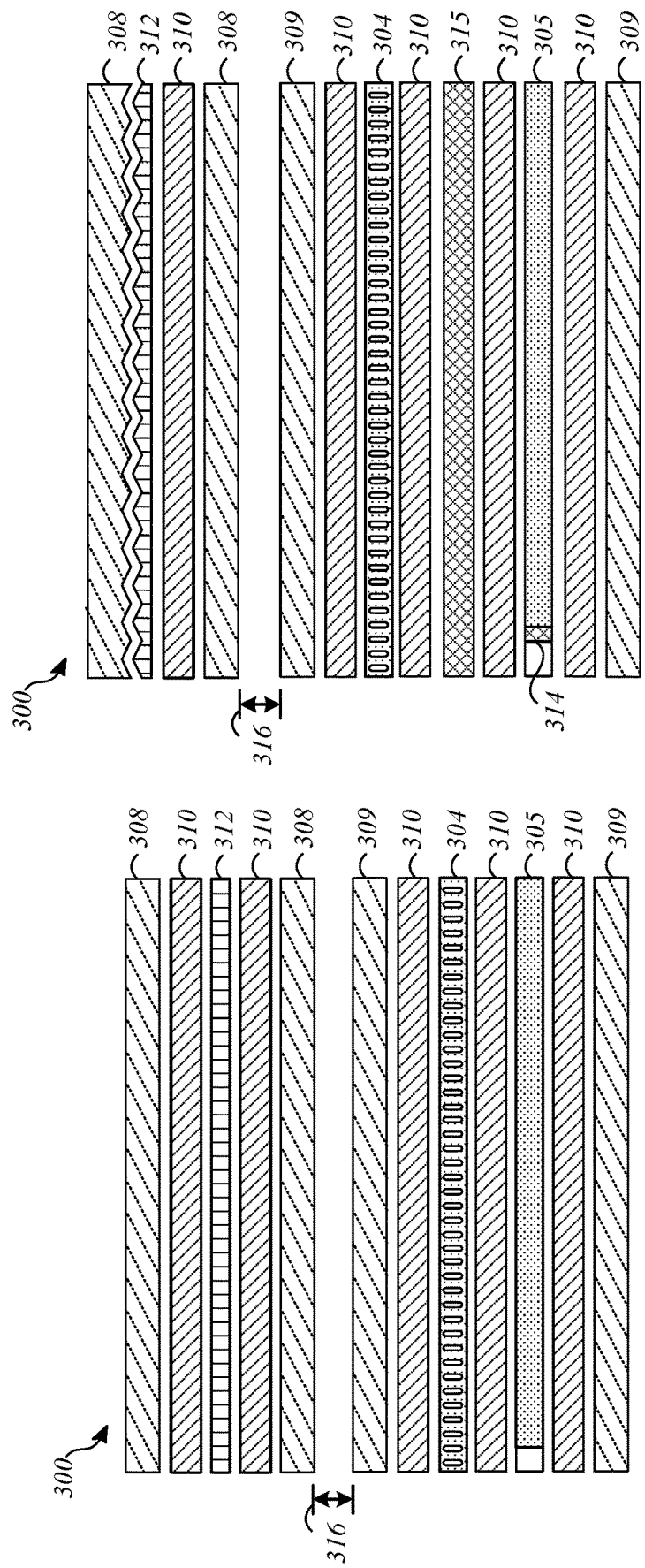
FIGS. 3A and 3B are exploded cross-sectional views of the panel of FIG. 1 taken along line 3-3 of FIG. 1 including layered optical components.

FIGS. 3A and 3B are cross-sectional views of the panel 100 of FIG. 1 taken along line 3-3 of FIG. 1. For clarity, the cross-sections in FIGS. 3A and 3B will be described as panel 300. The panel 300 includes a pair of embedded switchable components, for example, GHLC device 304 and light guide device 305. The switchable components extend between or are otherwise sandwiched or layered among first and second glazing layers 308, 309, lamination layers 310, thermal coatings 312, filters 314, 315, and an air gap 316 having functions and combinations similar to those described in reference to the panel 200 of FIGS. 2A and 2B.

The various optical components work together in the panel 300 to provide adjustable tint, in-glass lighting, privacy, diffuse reflection, thermal protection, and NVH performance features. Some aspects of the panel 300 in FIGS. 3A and 3B differ from the panel 200 in FIGS. 2A and 2B, and these differences are further described below. Similarities between the panel 200 of FIGS. 2A and 2B and the panel 300 of FIGS. 3A and 3B are not described below for the sake of brevity. One difference between the panel 300 and the panel 200 is the location of the switchable components within the stack-up. In the panel 300 of FIGS. 3A and 3B, the GHLC device 304 and the light guide device 305 are both disposed within a lower, bottom, or innermost portion of the panel 300, between the second glazing layers 309. The co-location of the switchable components in the same portion of the panel 300 can reduce a cost of repair for the panel 300.

For example, in the panel 300 of FIGS. 3A and 3B, the upper, top, or outermost portion includes only the first glazing layers 308, the lamination layers 310, and the thermal coatings 312, whereas the upper, top, or outermost portion of the panel 200 of FIGS. 2A and 2B includes a potentially more expensive switchable component (i.e., the GHLC device 204). The upper, top, or outermost portion of the panel 300 is the portion most likely to experience damage, for example, when the panel 300 serves as a roof panel, backlight, or side window of a vehicle cabin since debris or other environmental forces could most easily impact and damage the upper, top, or outermost portion of the panel 300. By moving both of the switchable components, specifically, the GHLC device 304 and the light guide device 305, into the lower, bottom, or innermost portion of the panel 300 between the second glazing layers 309, repair costs can be lowered when only the upper, top, or outermost portion of the panel 300 needs to be replaced due to damage.

Figure 4B:
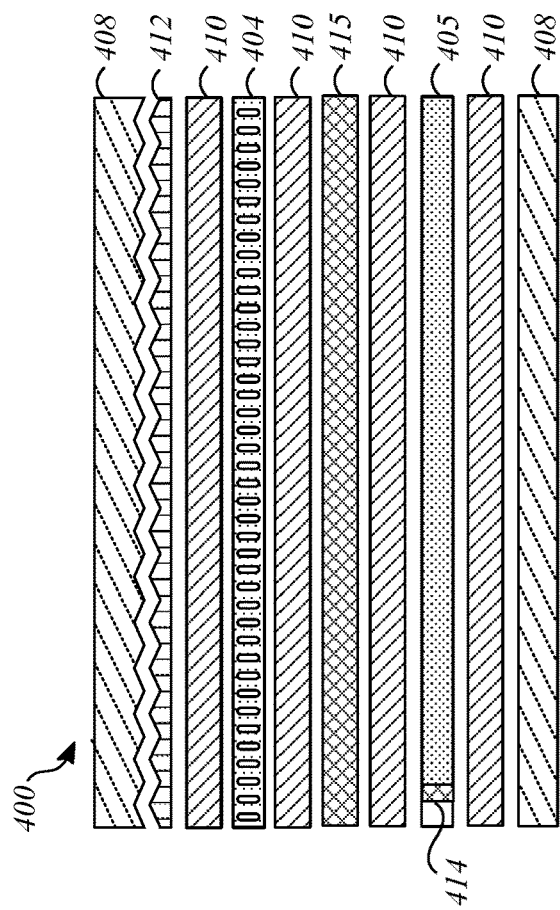
FIGS. 4A and 4B are exploded cross-sectional views of the panel of FIG. 1 taken along line 4-4 of FIG. 1 including layered optical components.
Figure 4A:
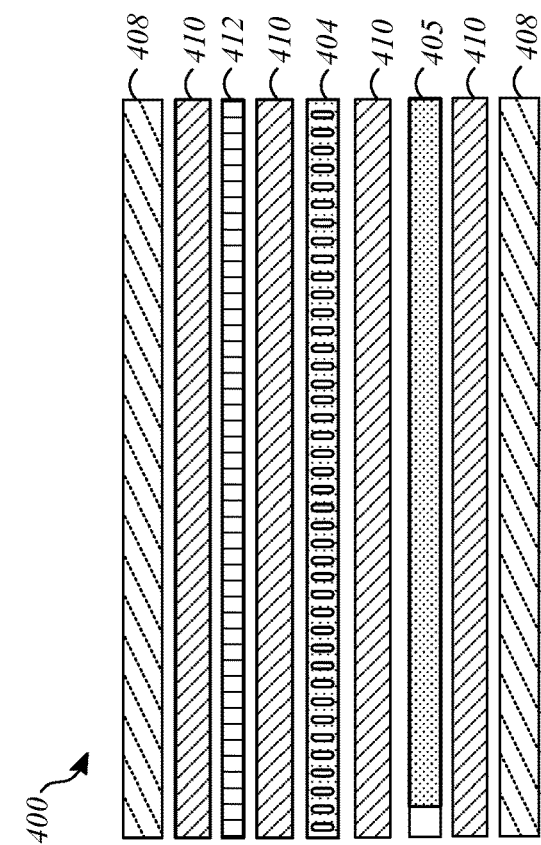

FIGS. 4A and 4B are cross-sectional views of the panel 100 of FIG. 1 taken along line 4-4 of FIG. 1. For clarity, the cross-sections in FIGS. 4A and 4B will be described as panel 400. The panel 400 includes a pair of embedded switchable components, for example, a GHLC device 404 and a light guide device 405. The switchable components extend between or are otherwise sandwiched or layered between glazing layers 408, lamination layers 410, thermal coatings 412, and filters 414, 415 having functions similar to those described in reference to the panel 200 of FIGS. 2A and 2B and the panel 300 of FIGS. 3A and 3B.

The various optical components work together in the panel 400 to provide adjustable tint, in-glass lighting, privacy, diffuse reflection, and thermal protection features. Some aspects of the panel 400 in FIGS. 4A and 4B differ from the panel 200 in FIGS. 2A and 2B and the panel 300 in FIGS. 3A and 3B, and these differences are further described below. Similarities between the panel 400 of FIGS. 4A and 4B, the panel 200 of FIGS. 2A and 2B, and the panel 300 of FIGS. 3A and 3B are not described below for the sake of brevity.

One difference between the panel 400 and the panels 200, 300 is the absence of an air gap within the stack-up. In the panel 400 of FIGS. 4A and 4B, there are only two glazing layers 408 that serve as the upper, top, or outmost and lower, bottom, or innermost layers of the panel 400. Another difference between the panel 400 and the panels 200, 300 is that the total number of lamination layers 410 is reduced in the panel 400 when compared to the panels 200, 300. The absence of an air gap and the reduction in number of the lamination layers 410 can lower the thickness, weight, and overall cost of the panel 400 when compared to the panels 200, 300.

Figure 5:
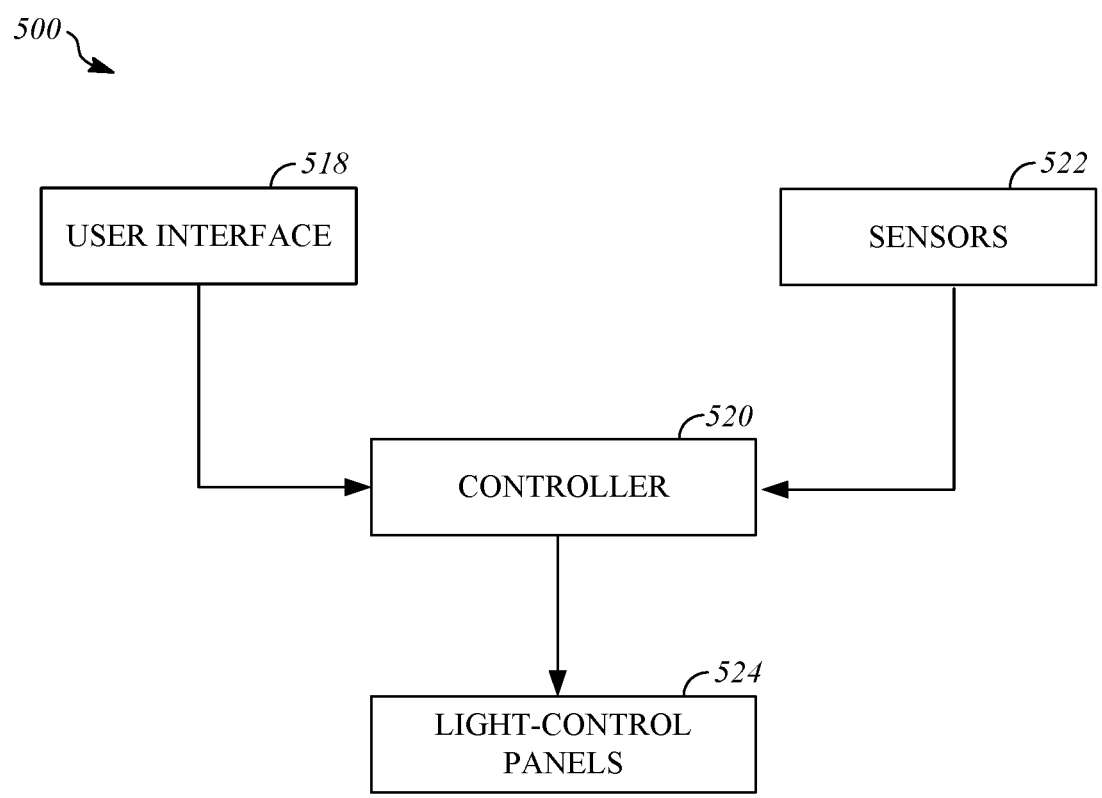
FIG. 5 is a block diagram that shows a panel control system.

FIG. 5 is a block diagram that shows a panel system 500. The panel system 500 can include a user interface 518, a controller 520, sensors 522, and one or more light-control panels 524, such as the panels 200, 300, 400 described above.

The user interface 518 allows a user to modify aspects of the operation of the panel system 500 and to set a desired state for the panel system 500, such as a state of privacy or a state of transparency associated with the light-control panels 524. That it, the user interface 518 can allow modification of operating parameters of the light-control panels 524, for example, based on user preferences.

The controller 520 coordinates operation of the panel system 500 by communicating electronically (e.g., using wired or wireless communications) with the user interface 518, the sensors 522, and the light-control panels 524. The controller 520 may receive information (e.g., signals and/or data) from the user interface 518, from the sensors 522 and/or from other portions (not shown) of the panel system 500.

The sensors 522 may capture or receive information related, for example, to an external environment where the panel system 500 is located. The external environment can be an exterior or an interior of a vehicle or an office, and information captured or received by the sensors 522 can relate to weather, such as a presence of rain or sunshine, or lighting conditions, such as a use of lighting by occupants within the vehicle or the office.

The panel system 500 can change an amount of light transmission through the light-control panels 524 based on a control signal, such as a signal from the controller 520. The control signal may cause the light-control panels 524 to modify a current light transmission characteristic, for example, from a first light transmission value to a second light transmission value that is different than the first light transmission value, or from a light transmitting state to a light blocking or reflecting (mirror) state. Technologies that may be used to implement the light-control panels 524 include switchable components such as light guide devices, suspended particle devices, electrochromic devices, polymer dispersed liquid crystal devices, and guest host liquid crystal devices.

Figure 6:
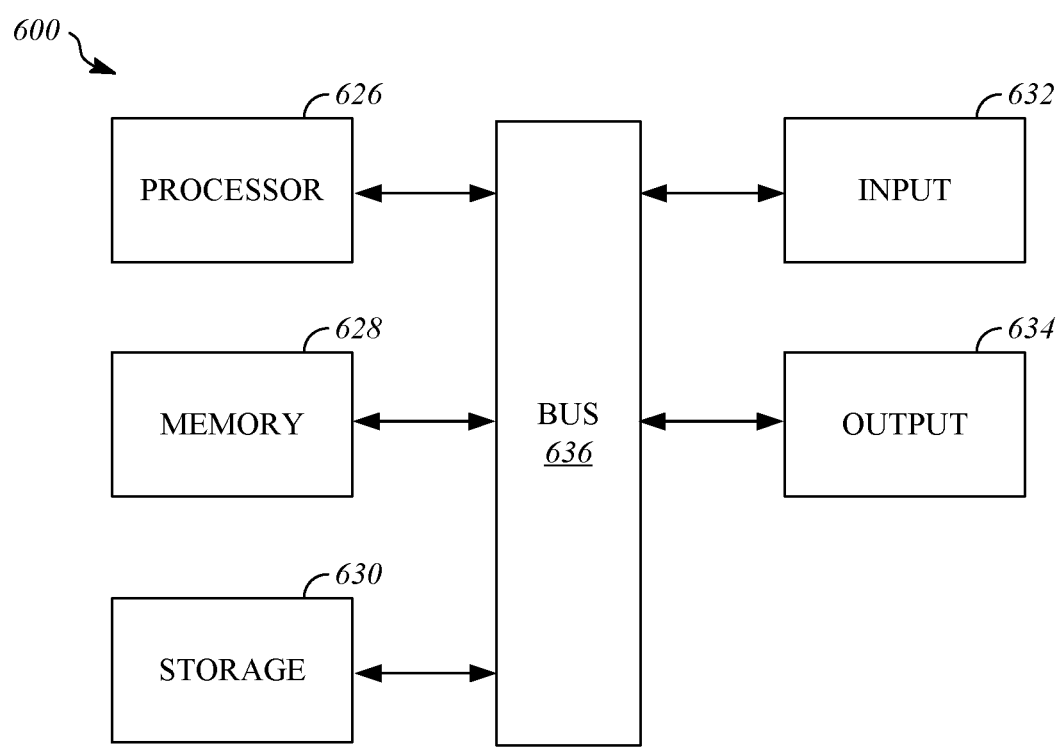
FIG. 6 is an illustration showing an example of a hardware configuration for a controller.

FIG. 6 shows an example of a hardware configuration for a controller 600 that may be used to implement the controller 520 and/or other portions of the panel system 500. In the illustrated example, the controller 600 includes a processor 626, a memory device 628, a storage device 630, one or more input devices 632, and one or more output devices 634. These components may be interconnected by hardware such as a bus 636 that allows communication between the components.

The processor 626 may be a conventional device such as a central processing unit and is operable to execute computer program instructions and perform operations described by the computer program instructions. The memory device 628 may be a volatile, high-speed, short-term information storage device such as a random-access memory module. The storage device 630 may be a non-volatile information storage device such as a hard drive or a solid-state drive. The input devices 632 may include sensors and/or any type of human-machine interface, such as buttons, switches, a keyboard, a mouse, a touchscreen input device, a gestural input device, or an audio input device. The output devices 634 may include any type of device operable to provide an indication to a user regarding an operating state, such as a display screen, a light-control panel, or an audio output.

As described above, one aspect of the present technology is the gathering and use of data available from various sources, such as from sensors 522 or user profiles, to improve the function of light-control panels such as panels 200, 300, 400. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used to deliver changes to light-transmission through light-control panels to best match user privacy preferences. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based light transmission through a light-control panel, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in light transmission through light-control panels can be implemented for a given user by inferring user preferences based on non-personal information data, a bare minimum amount of personal information, other non-personal information available to the device, or publicly available information.

What is claimed is:

1. A panel, comprising:
   first glazing layers;
   a first switchable component extending between the first glazing layers;
   second glazing layers disposed adjacent to and spaced from the first glazing layers by a distance defined by an air gap;
   a second switchable component extending between the second glazing layers; and
   a filter disposed within the second switchable component.

2. The panel of claim 1, comprising:
   a thermal coating extending between an outermost layer of the first glazing layers and the first switchable component.

3. The panel of claim 2, wherein the outermost layer of the first glazing layers has a frosted or etched surface and the thermal coating is directly applied to the frosted or etched surface.

4. The panel of claim 1, wherein the first switchable component is a liquid crystal device and the second switchable component is a light guide device.

5. The panel of claim 4, wherein the liquid crystal device is operated according to a first on-off pattern, wherein the light guide device is operated according to a second on-off pattern, wherein the second on-off pattern is inversely related to the first on-off pattern, and wherein, based on the first and second on-off patterns, light generated by the light guide device is blocked from visibility at a position outside of the first glazing layers and is visible from a position inside of the second glazing layers.

6. The panel of claim 1, wherein light generated by the second switchable component passes through the filter such that only predetermined, narrow RGB wavelengths of light reach a position inside of the second glazing layers from the second switchable component.

7. The panel of claim 6, wherein the filter is a first filter, further comprising:
a second filter extending between the second switchable component and an outermost layer of the second glazing layers.

8. The panel of claim 7, wherein light generated by the second switchable component passes through the second filter such that the predetermined, narrow RGB wavelengths of light are blocked from view at a position outside of the first glazing layers.

9. The panel of claim 8, wherein the first filter is a band-pass-type filter and the second filter is a notched-type filter.

10. A panel, comprising:
first glazing layers;
a thermal coating extending between the first glazing layers;
second glazing layers disposed adjacent to and spaced from the first glazing layers by a distance defined by an air gap;
first and second switchable components extending between the second glazing layers; and
a lamination layer extending between the first and second switchable components.

11. The panel of claim 10, wherein an outermost layer of the first glazing layers has a frosted or etched surface and the thermal coating is directly applied to the frosted or etched surface.

12. The panel of claim 10, wherein the first switchable component is a liquid crystal device that extends between the lamination layer and an outermost layer of the second glazing layers.

13. The panel of claim 12, wherein the second switchable component is a light guide device that extends between the lamination layer and an innermost layer of the second glazing layers.

14. The panel of claim 13, wherein the liquid crystal device is operated according to a first on-off pattern, wherein the light guide device is operated according to a second on-off pattern, wherein the second on-off pattern is inversely related to the first on-off pattern, and wherein, based on the first and second on-off patterns, light generated by the light guide device is blocked from visibility at a position outside of the first glazing layers and is visible from a position inside of the second glazing layers.

15. The panel of claim 10, further comprising:
a first filter disposed in the second switchable component, wherein light generated by the second switchable component passes through the first filter such that only predetermined, narrow RGB wavelengths of light reach a position inside of the second glazing layers from the second switchable component.

16. The panel of claim 15, further comprising:
a second filter extending between the first switchable component and the second switchable component,
wherein light generated by the second switchable component passes through the second filter such that the predetermined, narrow RGB wavelengths of light are blocked from view at a position outside of the first glazing layers, and
wherein the first filter is a band-pass-type filter and the second filter is a notched-type filter.

17. A panel, comprising:
first and second glazing layers;
first and second switchable components extending between the first and second glazing layers;
a thermal coating extending between the first switchable component and the first glazing layer; and
a filter extending between the first and second switchable components.

18. The panel of claim 17, wherein the filter is a first filter, further comprising:
a second filter disposed in the second switchable component,
wherein light generated by the second switchable component passes through the second filter such that only predetermined, narrow RGB wavelengths of light reach a position inside of the second glazing layer from the second switchable component, and
wherein light generated by the second switchable component passes through the first filter such that the predetermined, narrow RGB wavelengths of light are blocked from view at a position outside of the first glazing layer.

19. The panel of claim 17, wherein the first switchable component is a liquid crystal device and the second switchable component is a light guide device, wherein the liquid crystal device is operated according to a first on-off pattern, wherein the light guide device is operated according to a second on-off pattern, wherein the second on-off pattern is inversely related to the first on-off pattern, and wherein, based on the first and second on-off patterns, light generated by the light guide device is blocked from visibility at a position outside of the first glazing layer and is visible from a position inside of the second glazing layer.

20. The panel of claim 17, wherein the thermal coating is applied to a frosted or etched surface of the first glazing layer.

* * * * *